United States Patent [19]
Sovia et al.

[11] 3,921,239
[45] Nov. 25, 1975

[54] MULTI-PURPOSE VEHICLE

[76] Inventors: Cedric C. Sovia, 319 S. Lake St., Forest Lake, Minn. 55025; Kenneth W. Krengel, 1800 Highland Parkway, St. Paul, Minn. 55116

[22] Filed: May 15, 1974

[21] Appl. No.: 470,055

[52] U.S. Cl. .................................. 9/310 B; 280/18
[51] Int. Cl.² ........................................... A63C 15/00
[58] Field of Search .......... 9/1 R, 310 B, 6; 115/70; 280/18, 19; D12/11, 69; 52/3

[56] References Cited
UNITED STATES PATENTS

| | | | |
|---|---|---|---|
| 1,871,101 | 12/1932 | Waltz | 52/3 |
| 1,871,570 | 12/1932 | Weber | 52/3 |
| 2,926,362 | 3/1960 | Collins, Jr. et al. | 9/1 R |
| 3,380,090 | 4/1968 | Kenmuir | 9/310 B |
| 3,512,195 | 5/1970 | Porsche | 280/18 |
| 3,543,712 | 12/1970 | Vasilatos | 115/70 |
| D191,832 | 11/1961 | Greenberg | D34/15 |

*Primary Examiner*—Trygve M. Blix
*Assistant Examiner*—Sherman D. Basinger

[57] ABSTRACT

A multi-purpose vehicle is produced for use in all climates and all seasons of the year. It comprises a chassis which is preferably formed of structural foam plastic comprising high density polyethylene, high impact polystyrene and polypropylene. This material has a unique advantage in the present device, as it may be used to take strains not usually imposed on vehicles of the type, but is also buoyant so that a single vehicle may be used for moving over the ice and snow, but may also serve as a surfboard or canoe.

7 Claims, 15 Drawing Figures

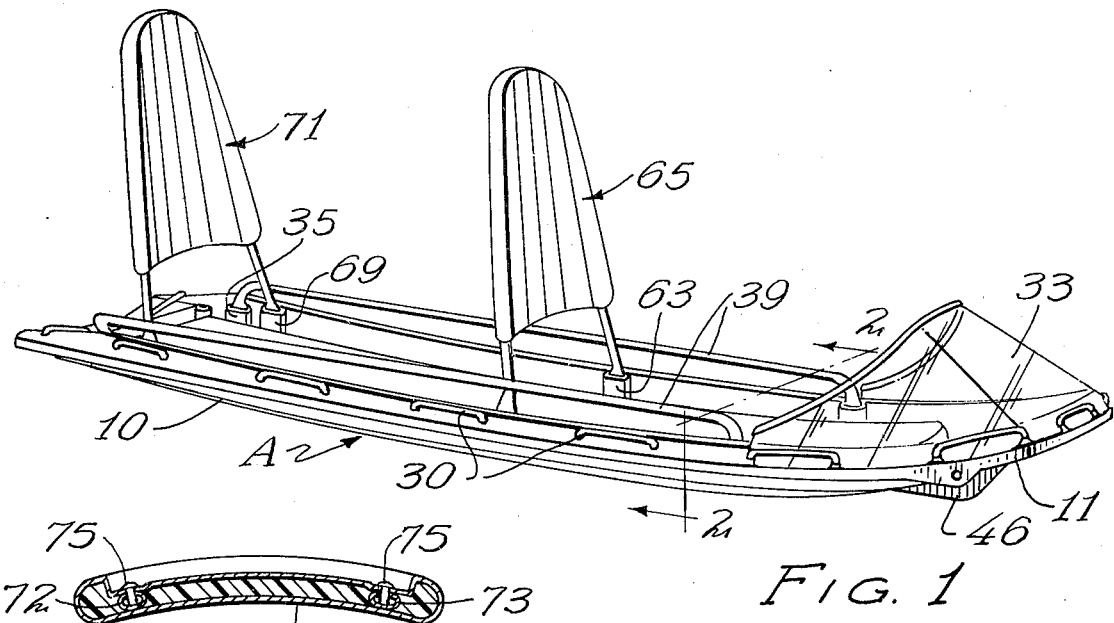
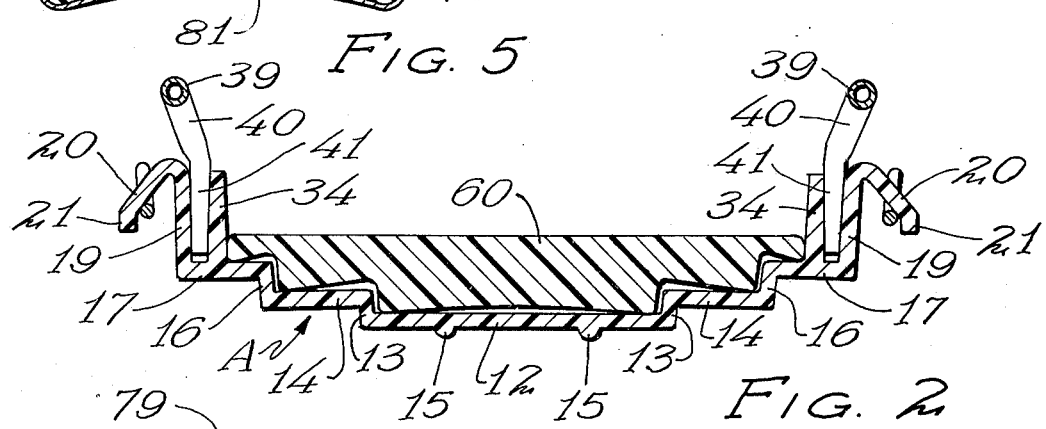
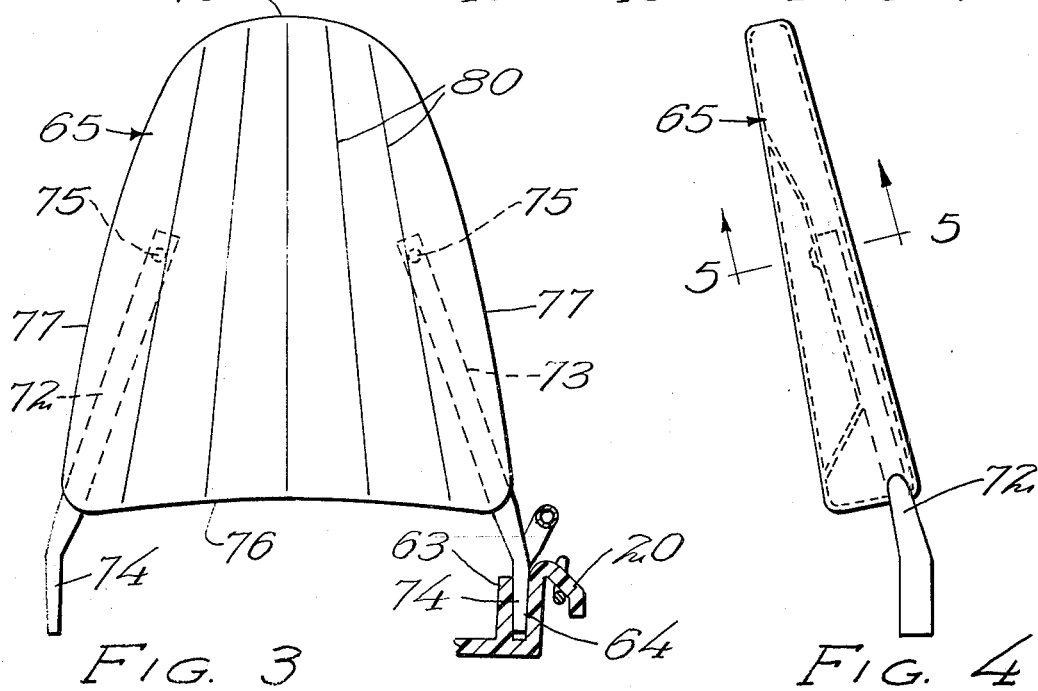

U.S. Patent Nov. 25, 1975 Sheet 2 of 4 3,921,239
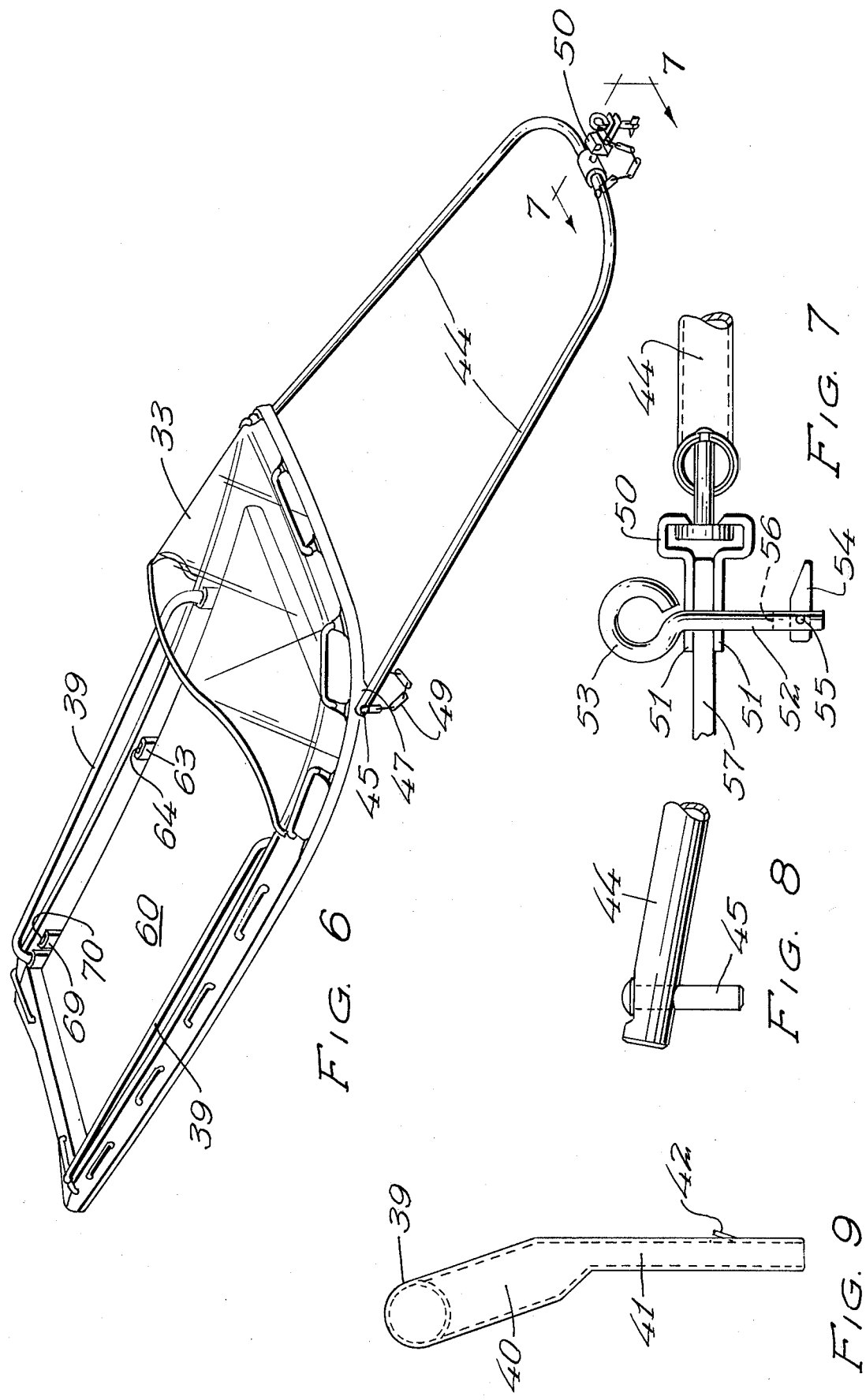

MULTI-PURPOSE VEHICLE

This invention relates to an improvement in multiple use vehicle and deals particularly with an apparatus which may be used as a toboggan, as a canoe type device, as a surfboard, as a cargo carrying vehicle, and for many other purposes.

BACKGROUND OF THE INVENTION

Various devices have been produced for use in sliding down snow covered hills and the like, these devices varying from toboggans and sleds to merely concave disks on which a child may sit while sliding over the snow. Toboggan type devices and sleds have also been used behind snowmobiles either for pulling passengers or for towing cargo. However, devices of this type are usually not capable of use as surfboards or as canoes, as they are not usually capable of floating with sufficient buoyancy to accomplish the desired result.

It is also true that devices which are used as sleds or toboggans are not usually used as the chassis of a cart, the body of a pontoon boat or a sail boat and the like. An important purpose of the present invention resides in the provision of a vehicle which may be used for any and all of these purposes, and which may be used throughout the year. Thus instead of necessitating sleds and toboggans for winter, two type devices for hauling cargo over the snow, a single chassis may be used, and form the basis of a surfboard or a canoe which may be used on the water or even a surfboard or a catamaran during the warmer months of the year.

SUMMARY OF THE INVENTION

The present device comprises a multi-purpose vehicle which is preferably formed of a material such as structural foam produced of a high density polythelene, a high impact polystyrene and polypropolene which is capable of sustaining itself on the surface of the water. This body in combination with a cushion which overlies the bottom of the device, produces a vehicle capable of withstanding the impacts and abrasion usually experienced while sliding over the ice and snow, but which may still be capable of sustaining one or two persons on the surface of the body of water. The structure is also such that it can sustain the twisting and the tortional effects produced by hauling people over the snow by use of a snowmobile. The device is also sufficiently strong so that it may be used as a sled or toboggan in hauling a considerable amount of cargo. Thus the device is useful not only as a recreational vehicle, but also as a means of transporting supplies to those who are snowed in in the colder climates during the winter months.

These and other objects, and novel features of the present invention, will be more clearly and fully set forth in the following specification and claims.

BRIEF DESCRIPTION OF THE DRAWINGS

FIG. 1 is a perspective view of the device in readiness for use as a toboggan or sled.

FIG. 2 is a vertical sectional view through the body of the chassis, the position of the section being indicated by the line 2—2 of FIG. 1.

FIG. 3 is a front elevational view of a seat back which may be used as a back support.

FIG. 4 is a side elevational view of the seat back shown in FIG. 3, the seat back having been removed from the body of the vehicle.

FIG. 5 is a sectional view through the seat back, the position of the section being indicated by the line 5—5 of FIG. 4.

FIG. 6 is a perspective view of the vehicle arranged for use as a cargo vehicle or as a passenger sled behind a snowmobile or the like.

FIG. 7 is a sectional view through the hitch used for connecting the vehicle to a snowmobile or the like.

FIG. 8 is a detail of one end of the body of the hitch, showing one of the pivots for the supporting of the hitch for upward and downward pivotal motion relative to the chassis.

FIG. 9 is a detail elevational view of an end of the end railing showing the manner in which it is secured to a side of the vehicle.

DESCRIPTION OF THE PREFERRED EMBODIMENTS

Figure 15:
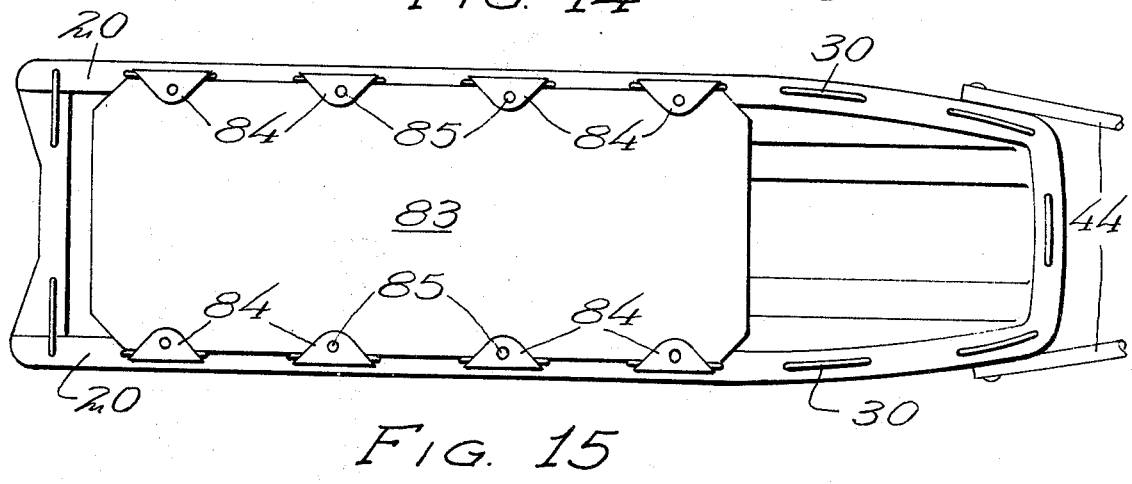
FIG. 15 is a top plan view of the chassis with the cargo cover in place therein.

Due to the fact that the vehicle is capable of various uses, it is quite difficult to show in one view the structure as it would always appear in use. For example, FIG. 1 discloses the vehicle as it would appear in use as a sled or toboggan, or also as it would appear in use as a canoe or kayak while moving over the surface of the water. FIG. 6 or the drawings illustrates in perspective the manner in which the vehicle would appear while being towed by a snowmobile or a boat, the seats being removed although obviously they might be used during such an operation. FIG. 15 indicates the device with the hand railings and the seats removed when the apparatus is serving merely as a cargo vehicle which is towed either by hand or by a towing vehicle. In all cases, however, the main chassis of the device remains the same, the main chassis being best illustrated in FIGS. 1, 2 and 10 and 11 of the drawings.

As indicated, the chassis A comprises an elongated body which is a substantially flat elevational view throughout the major portion of its length, as indicated at 10, but having a forward end 11 which curves forwardly and upwardly so as to more readily slide over the snow or water. As indicated in FIG. 2 of the drawings, the body 10 includes an elongated central portion 12 which forms the lowermost portion of the body, and which is connected along upper longitudinal edges by offsets 13 to strips 14 which are preferably parallel to the bottom panel 12. The bottom panel 12 may be provided with spaced parallel ribs 15 to more positively guide the vehicle over the snow or water.

Figure 10:
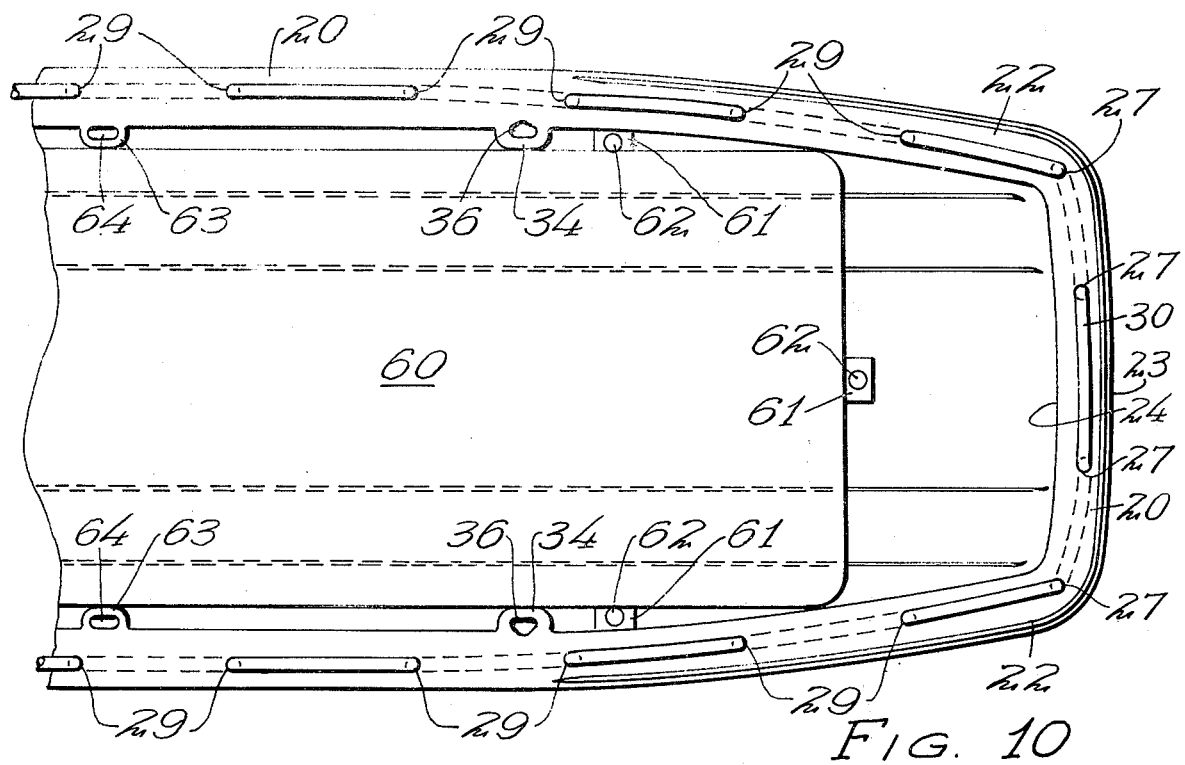
FIG. 10 is an enlarged plan view of the forward end of the vehicle with the cushion installed and the bungee accord in place, but with the hand rails removed for the purpose of illustration.
Figure 11:
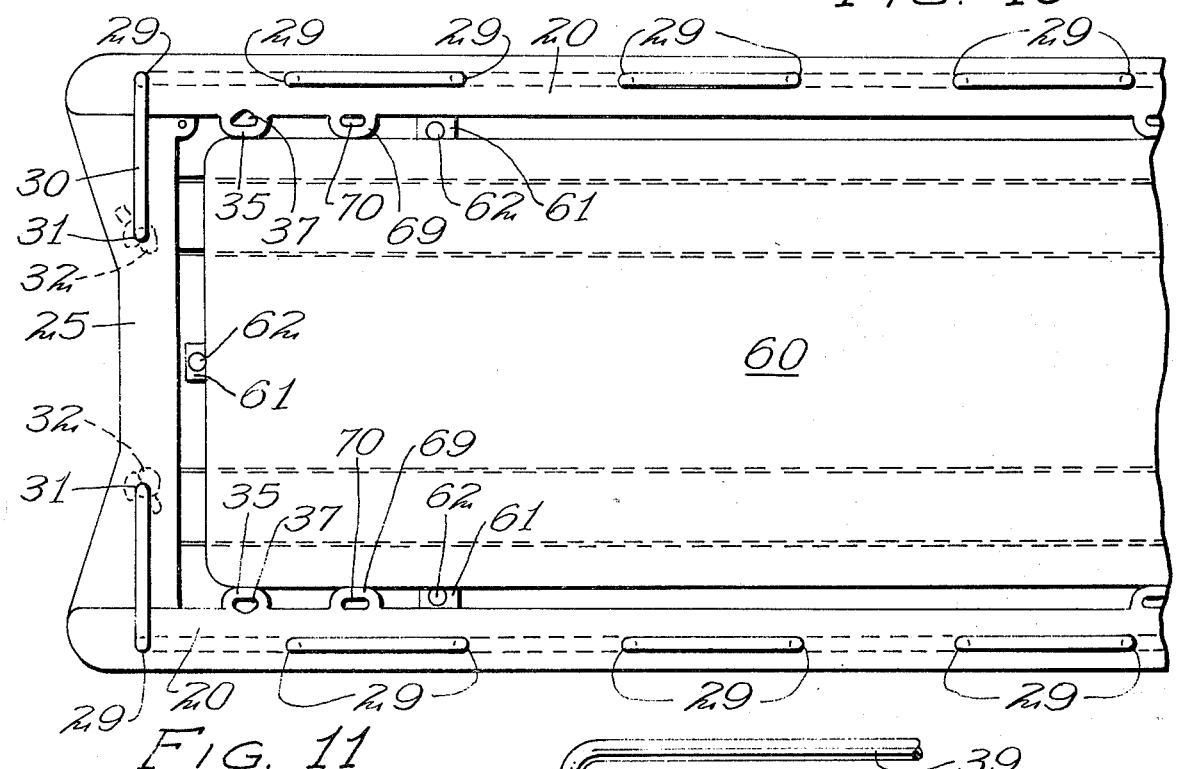
FIG. 11 is a plan view in enlarged form showing the rear end of the chassis.
Figure 12:
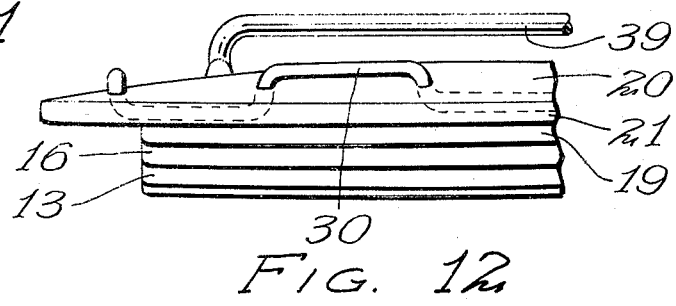
FIG. 12 is an elevational view of the rear end portion of the vehicle with side handles in place thereon.
Figure 13:
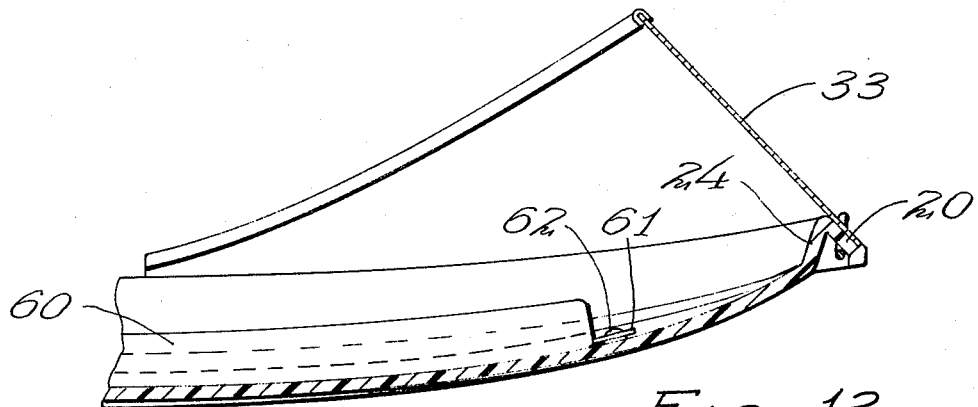
FIG. 13 is a longitudinal vertical section through the forward portion of the vehicle with the windshield attached thereto.

The outer sides of the strips 14 are connected by vertical offsets 16 to flat side portions 17. The outer edges of the strips 17 are connected by vertical sides 19 which are provided at their upper edge with a downwardly and outwardly inclined flange 20 which terminates in a short downwardly extending flange 21. As is indicated in FIG. 10, the body tapers in width toward the front as shown at 22, and the forward end 23 is slightly rounded. As is also indicated in FIG. 10 of the drawings the various panels 12, 14 and 17 merge to an area of equal depth at the forward end of the bottom portions so that the forward wall 24 is substantially at equal depth across the front. As indicated in the drawings, there are four openings 27 through the portion of the flange 20 which extends along the front of the body. Two of these openings are at the side edges of the front flange 20 while others are spaced in between. As also indicated in FIG. 10, there are a number of spaced openings 29 through the portions of the flange 20 which are on opposite sides of the forward section of the chassis. As indicated in FIG. 11 of the drawings, similarly spaced openings 29 extend through the portions of the flange 20 extending throughout the remainder of the length of the flanges. The bungee cord 30 is laced through the openings 27 and 29, alternate portions of the cord overlying the flange 20. There are also two apertures 31 through the rear flange 25 spaced inwardly from the sides of the chassis. The bungee cord 30 is either knotted at its ends as indicated at 32 beneath the openings 31 or, alternatively, the ends of the bungee cord are knotted or otherwise secured together between the apertures 31 beneath the flange 25. Thus the bungee cord encircles the entire periphery of the chassis, alternate portions of the cord being exposed above the flanges, and the remaining portions of the cord underlying the flanges.

The bungee cord is designed for several purposes. In the first place, it provides a means of grasping the chassis for lifting it or for manipulating it. Also, as will later be described, the exposed portions of the bungee provide a means of anchoring a tarpaulin or other cover, in the case the chassis is used for cargo hauling. The exposed portions of the bungee cord also form a means of detachably securing the windshield 33 as will be pointed out in a companion application.

The side walls of the chassis are provided with inwardly extending bosses 34, two such bosses being shown in the forward section and two such bosses 35 being shown in the rear section in FIG. 11. These bosses 34 and 35 are provided with generally semicylindrical sockets 36 and 37. These sockets are provided for accommodating the downturned ends of the side railings 39 as will be described.

As is indicated in FIG. 9 of the drawings, the side railings 39 are provided at their forward and rear ends by inclined tubular portions 40, which are bent to provide vertically extending rail supports 41 which are generally of semicircular cross sections. Tongues or ears 42 are struck from the outer surfaces of the vertical portion 31, and are inclined upwardly and outwardly. These tongues 42 are designed to bite into the material encircling the sockets 36 and 37, and to resist the removal of the rail ends. The material is resilient enough to normally prevent the removal of the vertical portions 41 of the railings from their sockets. However, the railings can be removed if sufficient upward pressure is applied. As a result, the railings may be used by the passengers of the vehicle during normal use. However, the railings may be removed in the event the device is being used for other purposes, such as cargo hauling.

A tubular generally U-shaped hitch 44 may be detachably secured to a forward end of the vehicle when the device is to be pulled by a ski mobile, a boat or the like. The U-shaped hitch 44 is somewhat resilient so that the opposite ends must be spread apart when the handle or hitch 44 is detachably secured or removed. The ends of the U-shaped handle 44 are provided with fixed pivot pins 45 which may be engaged in aligned pivot openings, one of which is indicated at 46 in FIG. 1 of the drawings. In preferred form, brackets such as 47 may be provided adjoining the pivot 45, these brackets being connected by short lengths of chain 49 to a suitable portion of the chassis bottom, not illustrated in the drawings.

A hitch 50 may be attached to the center of the U-shaped draw bar 44, the structure of the hitch being suitable for connection to a snowmobile or boat. In the arrangement illustrated in the FIG. 7 of the drawings, the hitch 50 includes a pair of vertically spaced plates 51 which are apertured to accommodate a pin 52 having an upper look end 53. A locking member 54 is pivotally connected at 55 in a notch 56 at the lower end of the pin 52 to prevent the hitch from being accidentally disengaged. The plates 51 are suitably spaced to accommodate a horizontal plate 57 which is shown in dotted outline in FIG. 7. This plate 57 extends rearwardly from the body of the snowmobile for attachment of the hitch 50. In view of the fact that the type of hitch which is used depends upon the type of attaching means which is provided on the snowmobile or boat, the hitch is not shown in great detail. The main purpose of the illustration is to indicate that the hitch may be provided on the U-shaped member 44 or so that the vehicle may be attached to a towing vehicle so that the device may be towed over the surface of the land or water.

A cushion or pad 60 overlies the bottom of the vehicle. It has been indicated that the body is made of structural foam and is preferably high density polyethelene, high impact polystyrene or polypropolene. The pad 60 is similarly formed of a buoyant material, and may comprise a shaped body of foam plastic enclosed within an outer covering, or may be of other material which adds buoyancy to the vehicle and also serves as an effective cushion. In preferred form, the body of the pad is enclosed within an outer coating or covering of leatherlike waterproof plastic sheeting and as best indicated in FIGS. 10 and 11 of the drawings, this covering is provided with projecting ears such as 61 about its periphery, which includes snaps 62 designed to anchor the pads securely onto the chassis. Thus the cushion 60 can be removed if necessary, but normally remains in place as a part of the chassis.

The outer wall of the vehicle is also provided with a pair of opposed bosses 63 having vertical parallel sockets 64 therein designed to provide a support for the front seat back which is indicated in general by the numeral 65. The pad 60 serves as a base of the seat, and the legs of the occupant extend forwardly. As shown in FIG. 11, a similar pair of bosses 69 are provided with vertical sockets 70 designed to support the rear seat back 71 as will be later described. The seats 65 and 71 are usually identical and constructed as is best illustrated in FIGS. 3, 4, and 5 of the drawings. A pair of tubular members 72 and 73 are provided with vertical ends 74 which are flattened to extend into the sockets 64 and 70, and the upper ends of these arms incline upwardly and inwardly toward one another as is best seen in FIG. 3. Tubular members 72 and 73 extend suitable recesses in the seat backs, and are secured in place by bolts 75 or other suitable means.

The seats 65 and 71 are preferably formed of structural foam of the type described, and include slightly upwardly bowed lower portions 76, sides which incline upwardly and inwardly as indicated at 77, and rounded top portions 79. Spaced creases 80 may be provided on the forward surfaces of the seats, and the forward surfaces of the seats are slightly concave as indicated at 81 in FIG. 5 of the drawings. Thus the seats may conform to the shape of the body and provide a comfortable rest for the occupants of the multi-purpose vehicle.

Figure 14:
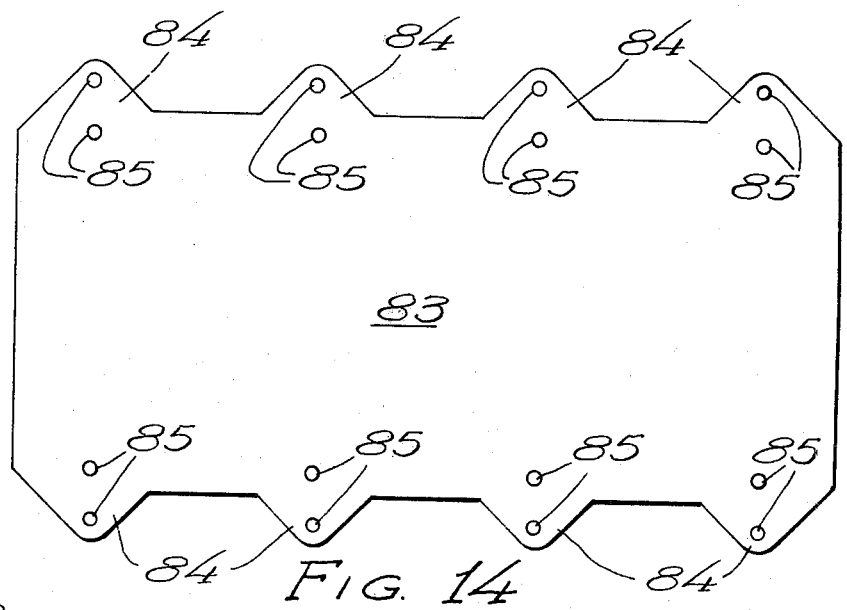
FIG. 14 is a plan view of the cover which may be used to cover cargo while being drawn over the snow.

The cargo cover 83 may vary in shape depending upon the amount of cargo being carried. The cover may comprise a tarpaulin or may be made of plastic sheeting to serve to protect the contents during transportation. FIG. 14 shows merely a rectangular body having opposed ears 84 which are designed to extend between the flange 20 of the body and the overlying portions of the bungee cord 30. Cooperable snaps 85 are provided on the projecting ears 84 and on the body of the covering sheets. When it is desired to cover the cargo, the ears 84 may be extended beneath the exposed portions of the bungee cord on opposite sides of the chassis, and the ears folded over and the snaps 85 engaged in order to hold the cover in proper position.

In accordance with the patent statutes we have described the principles of the construction and operation of our Multiple Purpose Vehicle, and while we have endeavored to set forth the best embodiments, we desire to have it understood that obvious changes may be made within the scope of the following claims without departing from the spirit of our invention.

We claim:

1. A multi-purpose vehicle including:
   a slightly upwardly concave chassis provided with an elongated body having an upwardly curved forward end,
   said body being formed of a plastic material capable of sustaining its weight in water,
   a windshield secured to said body at the forward end thereof to extend upwardly and inwardly therefrom,
   sides extending upwardly from opposite sides of said body and integral therewith,
   a downwardly and outwardly extending flange on said sides and continuing about the upwardly curved forward end of said body,
   inwardly extending bosses in opposed relation on opposite portions of said sides and having upwardly opening parallel sockets therein,
   a seat back having seat back supporting members extending downwardly therefrom to terminate in parallel vertically extending ends engaged in said sockets,
   a second pair of opposed inwardly extending bosses on said sides forwardly of said first named bosses,
   a third pair of opposed inwardly extending bosses on said sides spaced rearwardly of said second pair of bosses,
   said second and third pairs of bosses having vertical inwardly opening sockets therein, and
   a side rail extending longitudinally of each side of said body having parallel downwardly extending ends extending into the second and third pairs of sockets.

2. The structure of claim 1 and in which said seat back is formed of buoyant material.

3. The structure of claim 1 and including a pad of buoyant material overlying the major portion of said chassis body.

4. The structure of claim 3 and including outwardly projecting ears on said pad, and including detachable fasteners securing said ears to said body.

5. The structure of claim 1 and in which said vertically extending ends of said seat back supporting members are of generally rectangular cross section.

6. The structure of claim 1 and downwardly projecting ends of said side rails are of substantially semicircular cross section, and said second and third pairs of sockets are similarly shaped.

7. The structure of claim 1 and in which said downwardly and outwardly extending flange on said sides and forward end of said body is provided with a series of spaced apertures, and including a flexible cord interlaced through said apertures, said cord overlying areas of said flange between spaced apertures, and underlying intermediate areas of said flange between said apertures.

* * * * *